Nov. 2, 1965    J. F. JONES ETAL    3,214,908
COMBINED FUEL GOVERNOR AND ELECTRIC GENERATOR
DRIVE FOR A GAS TURBINE
Filed June 21, 1963    2 Sheets-Sheet 1
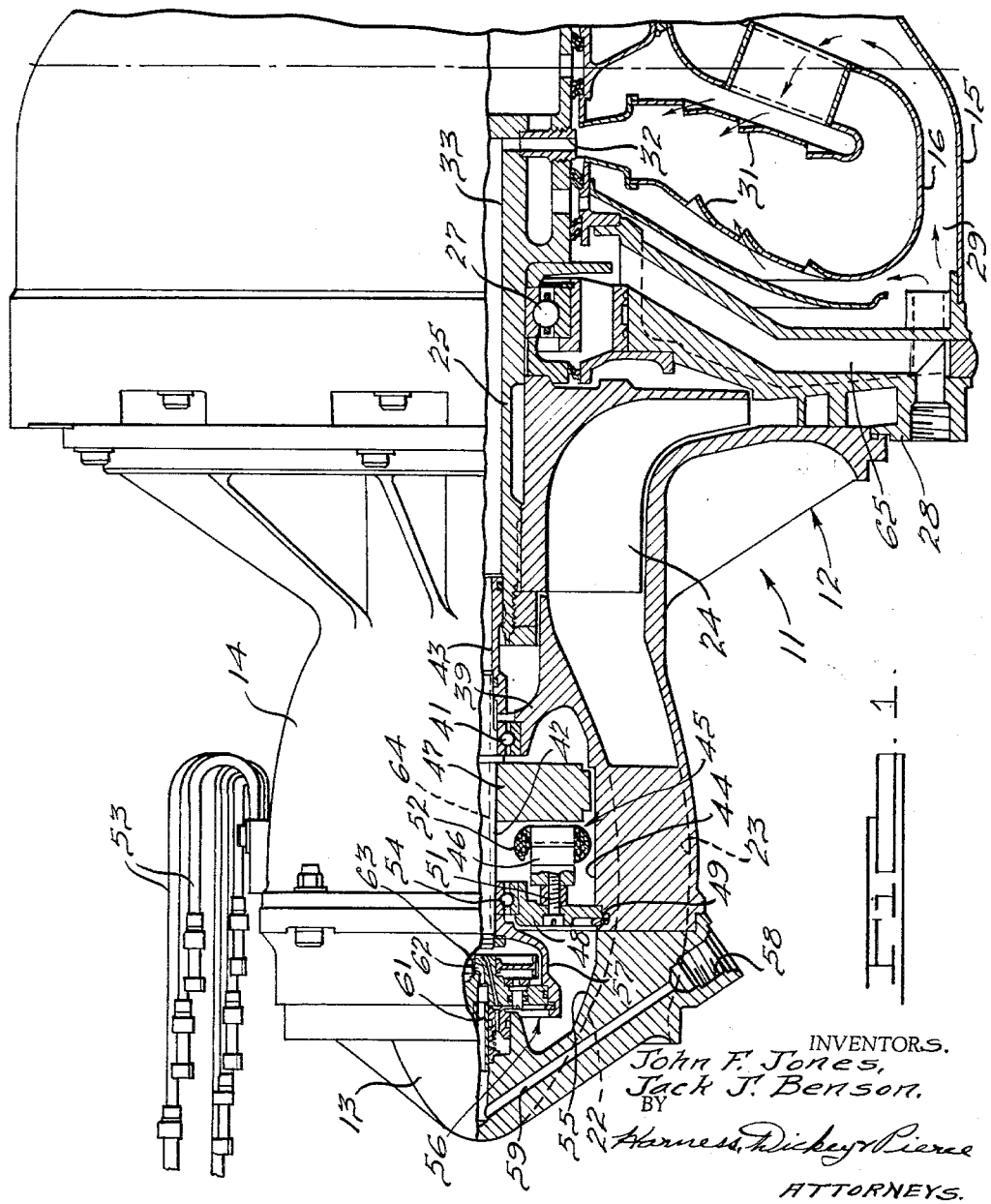
INVENTORS.
John F. Jones,
Jack J. Benson.
BY
Harness, Dickey & Pierce
ATTORNEYS.

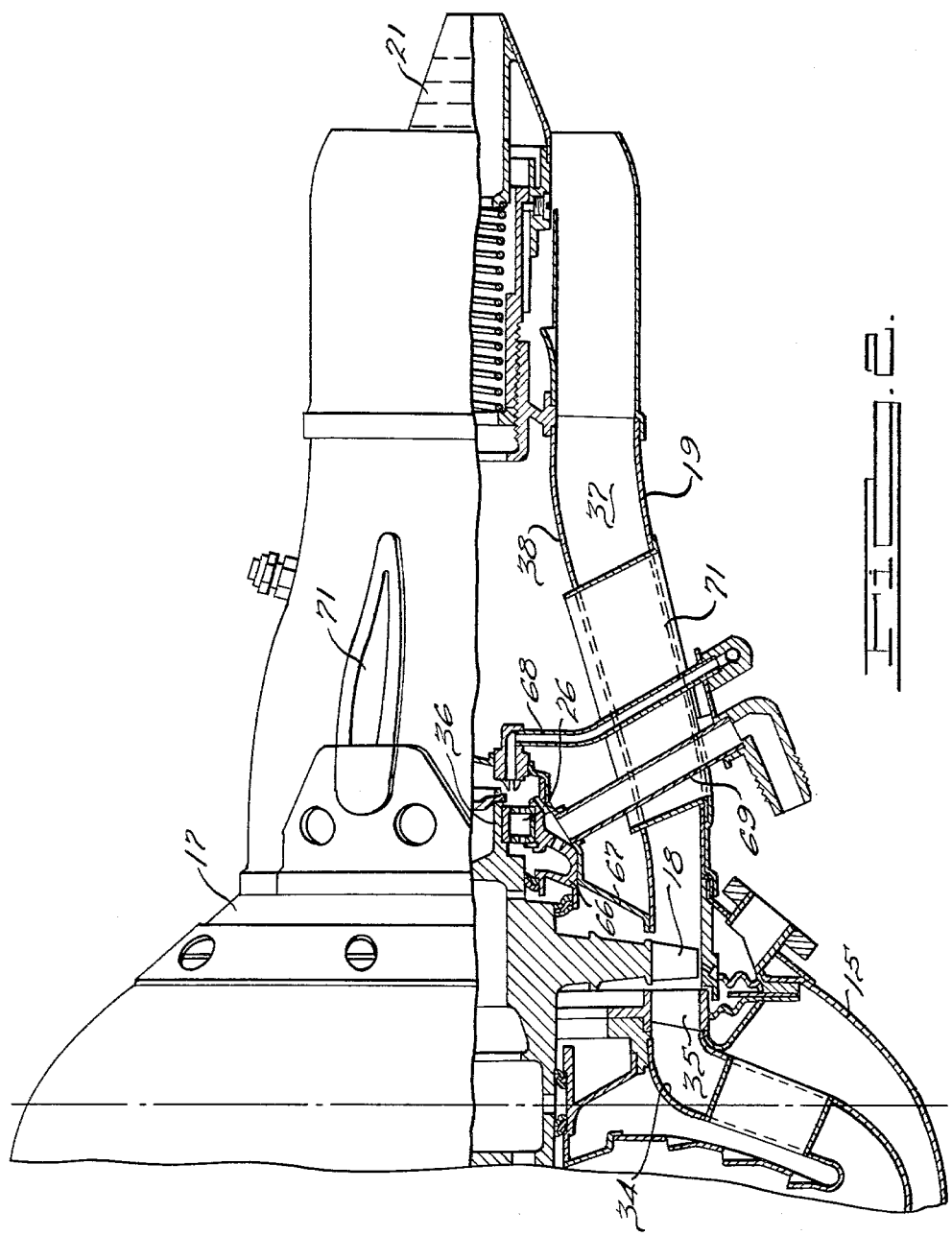

United States Patent Office 3,214,908
Patented Nov. 2, 1965

3,214,908
COMBINED FUEL GOVERNOR AND ELECTRIC
GENERATOR DRIVE FOR A GAS TURBINE
John F. Jones, Berkley, and Jack J. Benson, Lathrup Village, Mich., assignors to Williams Research Corporation, Walled Lake, Mich., a corporation of Michigan
Filed June 21, 1963, Ser. No. 289,537
4 Claims. (Cl. 60—39.28)

This invention relates to jet engines, and more particularly to engines having fuel governors and electrical generators associated therewith.

It is an object of the invention to provide a novel and improved jet engine construction in which a turbine rotor, fuel governor and electrical generating means are compactly arranged in coaxial relation and will rotate at the same speed.

Other objects, features and advantages of the present invention will become apparent from the subsequent description, taken in conjunction with the accompanying drawings in which:

FIGURE 1 is a partially sectioned elevational view of the forward portion of the novel jet engine of this invention, and FIG. 2 is a partially sectioned elevational view of the rear portion of the jet engine, and which may be placed to the right of FIGURE 1 in order to view the entire engine.

Briefly, the illustrated embodiment of the invention comprises a jet engine having a radial compressor at its forward end, and a forward extension on the compressor shaft which drives the rotating portions of an electrical generator and a fuel governor. The generator is disposed between the governor and compresors, the fuel leaving the governor flowing axially through the shaft extension on which the generator rotor is mounted, and toward fuel nozzles which direct the fuel radially outwardly into an annular combustion chamber.

Referring more particularly to the drawings, the jet engine is generally indicated at 11 and comprises a housing generally indicated at 12, the housing having a streamlined and vaned entrance portion 13, a compressor portion 14, a main portion 15 surrounding the combustion chamber 16, and a portion 17 surrounding a turbine rotor 18. An additional housing portion 19 extends rearwardly from portion 18 for guiding the exhaust gases to form an annular jet stream. An adjustable area jet nozzle 21 is mounted within the exit of housing portion 19.

Entrance portion 13 is of streamlined shape and has a plurality of intake passages 22 leading to aligned passages 23 in housing portion 14. A compressor 24 is rotatably mounted on a shaft 25 supported by bearings 26 and 27, and is adapted to compress air leaving passages 23 and direct them radially into a diffuser section 28. The air in the diffuser section will be guided into an axial direction and into an annular chamber 29 within housing portion 15 and surrounding annular combustion chamber 16. Air entering the combustion chamber through louvers 31 will combine with fuel being fed into the combustion chamber by nozzles 32 carried by shaft 25, the latter having a central passage 33 for feeding the nozzles.

The combustion gases leaving annular exit portion 34 of combustion chamber 16 will be led by vanes 35 to turbine 18 mounted on shaft 25, the shaft having an extension 36 supported by bearing 26. Gases leaving turbine 18 will pass through an annular chamber 37 formed by housing portion 19 and an inner member 38, and will exit as a jet stream past adjustable nozzle 21.

An annular inwardly extending web 39 within housing portion 14 supports a bearing 41 for a shaft extension 42 which is connected to shaft 25 by a splined quill 43. A central chamber 44 is formed in housing portion 14 forwardly of web 39, and encloses an electrical generator or alternator, generally indicated at 45. This alternator includes a stator 46 and a rotor 47. Stator 46 is secured to an annular plate 48 which is fixed to the forward end of housing portion 14 by a snap ring 49, a plurality of threaded fasteners 51 extending through plate 48 and securing stator 46 thereto. The stator carries coils 52, and leads (not shown) from the these coils extend to conduits 53 mounted outwardly of housing portion 14 so that the alternator may be connected to an associated unit (not shown). A bearing 54 is mounted on plate 48 and supports the forward end of extension 42.

Plate 48 separates chamber 44 from a central chamber 55 formed within member 13. A fuel governor generally indicated at 56 is mounted within chamber 55. The details of this fuel governor are shown and described in copending application Serial No. 278,338, filed May 6, 1963 by Sam B. Williams and John F. Jones, said copending application being assigned to the assignee of the present invention. It may be stated, however, that the fuel governor has a housing 57 which is secured to the forward end of shaft extension 42 and rotates therewith, the fuel entering the housing by means of an entrance port 58 in member 13, an inclined conduit 59 and a central conduit 61. A port 62 is controlled by a counterweight-valve member shown partially at 63, and fuel will pass into housing 57 and from there into a central passage 64 in extension 42. Counterweight-valve member 63 will move toward or away from port 62 in accordance with the speed of rotation of shaft 25 with which it will rotate, as explained more fully in the aforementioned copending application, and will therefore regulate the rate of flow of fuel to nozzles 32 so as to prevent excessive speed.

Rotor 47 is secured to shaft extension 42 immediately adjacent stator 46, and will rotate with the shaft extension during operation of the jet engine, thereby generating electricity which will be carried by conduits 53.

Bearing 27 is supported by diffuser plate 28, the diffuser plate having a conduit 65 for oil used to lubricate the bearing.

Bearing 26 is mounted in a housing 66 supported by an annular member 67, and is supplied with oil by a conduit 68, the oil leaving through a conduit 69, with conduits 68 and 69 extending through one of a plurality of cooling air ports 71 which supply cooling air to the parts in the vicinity of the bearing.

It will thus be seen that a jet engine is provided which combines an electric generator and a fuel governor with the compressor shaft in a novel manner, the arrangement being especially useful for jet engines in which the fuel is centrally fed through the compressor shaft and delivered outwardly to an annular combustion chamber. The alternator 47 and governor housing 57 are coaxial with shaft 25 and are driven at the same speed, thus eliminating the need for gearing connecting the governor or rotor with the compressor shaft and reducing to a minimum the space requirements for the unit, especially in a radial direction.

While it will be apparent that the preferred embodiment of the invention disclosed is well calculated to fulfill the objects above stated, it will be appreciated that the invention is suceptible to modification, variation and change without departing from the proper scope or fair meaning of the subjoined claims.

What is claimed is:

1. In a jet engine, a turbine, a compressor, a shaft connecting said turbine and compressor, an electric generator having a rotor rotatable with said shaft, a fuel governor having entrance and exit ports, a central passage in said shaft connected to said exit port, a rotatable chamber enclosing said governor and connected to said shaft to be rotated thereby, said governor including a rotatable fuel valve connected to said chamber and responsive to rotation thereof to control the amount of fuel flowing through said governor to said central passage in response to its rotation.

2. In a jet engine, an annular combustion chamber, a compressor on one side of said combustion chamber, a turbine on the other side of said combustion chamber, a compressor shaft connecting said turbine and compressor and extending through said combustion chamber, a central fuel passage in said compressor shaft, outwardly extending fuel delivery nozzles on said shaft leading to said combustion chamber, a shaft extension connected to said shaft and extending forwardly from said compressor, an electric generator rotor secured to said shaft extension, an electric generator stator mounted coaxially with said shaft extension adjacent said rotor, a fuel governor having a housing secured to, rotatable with and coaxial with said shaft extension, an exit from said fuel governor housing, a central passage in said shaft extension connecting said exit with said compressor shaft passage, and a rotatable fuel valve carried by said governor and located in said housing, said valve being responsive to rotation of said housing for controlling fuel flow to said central passage in response to its rotation.

3. In a jet engine, a housing having an air intake portion, a fuel passage in said housing portion, a central chamber in said housing portion, a fuel governor centrally disposed within said chamber, a compressor housing portion rearwardly of said air intake housing portion, a central chamber in the end of said compressor housing portion adjacent said air intake portion, an electric generator centrally mounted in said last-mentioned chamber, a compressor shaft carrying a compressor disposed within said compressor housing portion, a compressor shaft extension non-rotatably secured to said compressor shaft and extending through the central chamber in said compressor housing portion, bearings supported at the ends of said last-mentioned chamber and rotatably supporting said shaft extension, said electric generator comprising a rotor fixed to said shaft extension and a stator fixed to said compressor housing portion, said fuel governor comprising a housing fixed to the forward end of said shaft extension and rotatable therewith, said governor also comprising a rotatable fuel valve located inside and connected to said housing and responsive to the rotation thereof, and central passageways in said shaft extension and compressor shaft connected to the interior of said fuel governor housing, said valve controlling the flow of fuel to said passageway.

4. The combination according to claim 3, said compressor housing portion further comprising an annular plate supporting one of said shaft extension bearings and said stator, said plate separating the air intake housing portion chamber from the compressor housing portion chamber.

References Cited by the Examiner
UNITED STATES PATENTS

| | | | |
|---|---|---|---|
| 2,432,359 | 12/47 | Streid | 60—39.74 |
| 2,540,456 | 2/51 | Price | 290—52 |
| 2,629,225 | 2/53 | Ammann | 60—39.74 |
| 2,832,193 | 4/58 | Wood | 60—39.28 |
| 2,856,755 | 10/58 | Szydlowski | 60—39.74 |
| 2,925,714 | 2/60 | Cook | 60—39.74 |
| 3,085,619 | 4/63 | Penny | 60—39.28 |
| 3,088,476 | 5/63 | Kellner | 137—56 |
| 3,132,660 | 5/64 | Sladek | 137—56 |

SAMUEL LEVINE, *Primary Examiner.*